Sept. 22, 1959  L. S. KUYKENDALL  2,905,021
MULTIPLE SHAFT POSITIONING SYSTEM
Filed Jan. 9, 1957

INVENTOR.
LELAND S. KUYKENDALL
BY
ATTORNEYS

United States Patent Office 2,905,021
Patented Sept. 22, 1959

2,905,021

MULTIPLE SHAFT POSITIONING SYSTEM

Leland S. Kuykendall, Cedar Rapids, Iowa, assignor to Collins Radio Company, Cedar Rapids, Iowa, a corporation of Iowa Application January 9, 1957, Serial No. 633,256

1 Claim. (Cl. 74—529)

This invention relates to variable impedance systems and the actuating mechanism therefor and more particularly to an impedance system having a wide range of impedance selectable in steps with a smoothly variable variation between said steps.

Prior methods of achieving impedance variations have comprised concentric knobs, the outer controlling the step values and the inner controlling a continuously variable value having a maximum equal to the step difference. Necessarily, this type of construction required concentric shafts and control mechanisms. Further, two knobs were necessary for a single function, making the use of two knobs confusing and inconvenient.

It is an object of this invention to provide a convenient single knob control for variation of a separate stepped shaft plus a smoothly variable shaft rotation.

It is a further object of this invention to provide a locking detent mechanism having high resistance against load-originated motions, such as vibrations arising in the load, pushing against the detent yet having a light drive-shaft originated control.

It is a feature of this invention that an input shaft provides a continuous drive of a first shaft over a substantial portion of a revolution beyond which portion detent unlocking is provided for, with direct actuation of a second, detented shaft.

It is a further feature of the invention that a rigidly-locked load shaft detent is unlocked for either direction of rotation by the actuating shaft with slight pressure providing, however, a very high detent impedance to the load shaft motion.

Further objects, features, and advantages of the invention will become apparent from the following description and claims when read in conjunction with the drawing in which:

Figure 1:
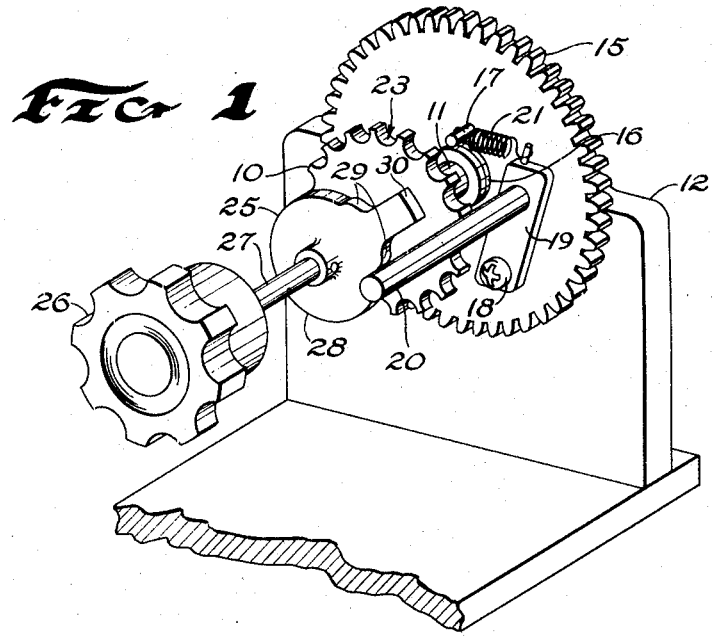
Figure 1 shows an isometric view of the locking system.

In Figure 1 a fixed detenting sprocket 10 is mounted on a shaft 11. Sprocket 10 and tubular bushing or shaft 11 are held rigidly by mounting on a base 12. Freely running on bushing 11 is a disc 15, shown here as a drive gear. Other forms of coupling, such as belting, roller sprocket, or direct use in the detented form, may be used in place of the gearing shown. Disc 15 has a bearing bushing 16 which permits the detented drive gear to turn freely with a minimum of friction. Mounted on disc 15 is a fixed pin 17 and a fixed pivot in the form of a screw 18. Mounted on pivot 18 is a detent lock bar 20 held parallel to the axis of rotation of the disc 15. Detent lock bar 20 is mounted on a swing bar 19 which swings in a plane parallel to the disc 15. Between the free end of swing bar 19 and fixed pin 17 is a tension spring 21.

The geometry of the detent lock bar relative to the mounting axle 11 and fixed detent sprocket 10 is such that a slight outward motion radially of the detent lock bar 20 clears the bar of the sprocket apertures 23, permitting the detented disc 15 to rotate freely. A slight return motion inward, radially, permits the lock bar to drop into one of the adjacent apertures. Spring 21 provides sufficient radial inward force to prevent the lock bar from being popped out by the load-originated forces present. The detent lock bar 20 is long enough to extend from the swing bar 19 past the fixed detent sprocket 10 to an area intersecting the plane of the interlocking cam 25. At all positions of rotation the detent bar runs parallel to the fixed bushing 11.

Input motion to the mechanism is initiated by some means such as a knob 26. Other means such as automatic positioning systems, motors, etc., are also contemplated as within the invention. Drive shaft 27 carries knob 26 and unlocking cam 25. Unlocking cam 25 is pinned to drive shaft 27 so as to be driven thereby. Drive shaft 27 extends through centrally of and coaxial to bushing 11, and is mounted for free rotation therein. Unlocking cam 25 has a large portion of its circumference 28 at a constant radius or less. At the ends of this circumference 28 are cam rises 29. Terminating cam rises 29 is a lug 30 which acts as a positive coupling with detent lock bar 20 should the need arise. The rise of the cam surfaces 29 is sufficient to lift detent lock bar 20 out of the apertures 23 of the fixed detent sprocket just prior to the lug 30 contacting the lock bar 20.

Figure 2:
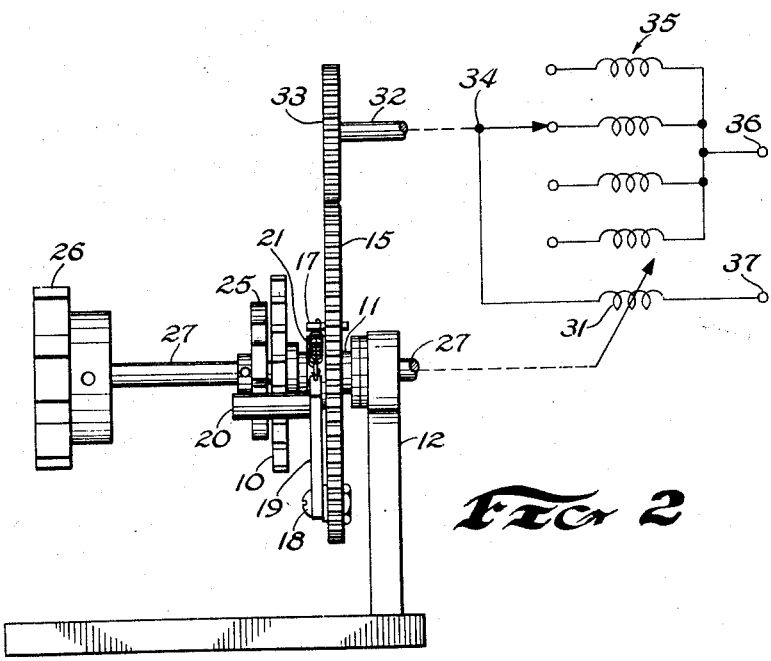
Figure 2 shows a side elevation of Figure 1 including drive shafts to the variable controlled.

Figure 2 shows a side elevation of the mechanism of Figure 1 including the output end of the drive shaft 27 coupled to a smoothly varying continuous rotation inductance 31. A second shaft 32 is coupled by gear 33 to the geared portion of disc 15. Shaft 32 is coupled to a switch 34 which selects one of a number of stepped-value fixed inductances 35. The rotational increments of switch 34 are used to establish the gear ratio between 15 and 33 taking into account the angular displacements of the apertures 23 of the detent sprocket.

Electrically, the stepped fixed inductances 35 are connected together and to a common terminal 36. The tap of switch 34, selecting one of the fixed inductances, is connected to one end of the smoothly varying inductor 31. The other end of the inductor 31 is connected to a second terminal 37. Thus, between terminals 36 and 37 appears a continuously varying inductance, varying between stepped values by smoothly varied increments.

In operation, knob 26 is rotated over the substantially entire revolution possible between cam rises 29. This varies inductance 31 over substantially its entire value. In the event, however, that this impedance variation is not sufficient for the task at hand, the knob 26 is rotated further in the direction desired for the desired inductance variation. This further rotation brings one of the cam rises 29 under detent lock bar 20 to unlock it from one of the apertures 23. The further rotation of drive-shaft 27 brings the lug 30 up against the lock bar 20 to positively turn the detented drive gear 15.

If the inductance value now selected by rotation of the detented drive-shaft brings an inductance value greater than needed, then rotation of drive-shaft 27 back away from that limit adjusts variable inductance 31 to the exact value desired. Of course, if an overshoot occurs, rotation back to the other cam rise will reverse the rotation of the detented drive gear since the unlocking cam, the sprocket, and the action of the lock bar are all rotationally symmetrical. Motion of the unlocking cam away from the rise 29 permits spring 21 to pull lock bar 20 into apertures 23 to provide a secure detent.

Although this invention has been described with respect to particular embodiments thereof, it is not to be so limited as changes and modifications may be made therein which are within the full intended scope of the invention as defined by the appended claim.

I claim:

A multiple shaft positioning system comprising, a mounting base, a tubular bushing having one end non-rotatably mounted transversely through said mounting base, a sprocket including peripherial detents axially and non-rotatably mounted on the other end of said bushing, said sprocket and said bushing adapted to receive a first shaft therethrough, a rotatable driving means axially mounted on said tubular bushing, said driving means carrying a locking means engageable with said sprocket detents, spring means biasing said locking means against said sprocket detents, a second shaft, means connecting said second shaft with said driving means, and a cam rigidly mounted on said first shaft and engageable with said locking means, whereby when said first shaft is rotated with said locking means in said detent, only said first shaft will turn and when said cam removes said locking means from a detent in said sprocket both of said first and second shafts will turn.

References Cited in the file of this patent

UNITED STATES PATENTS

| | | |
|---|---|---|
| 100,510 | Durran | Mar. 8, 1870 |
| 169,574 | Parr | Nov. 2, 1875 |
| 771,490 | Palmer | Oct. 4, 1904 |
| 876,752 | Waldron | Jan. 14, 1908 |
| 1,429,227 | Dubilier | Sept. 19, 1922 |
| 2,177,370 | McDonough | Oct. 24, 1939 |
| 2,475,159 | Spararagen | July 5, 1949 |
| 2,493,272 | Spararagen | June 3, 1950 |
| 2,660,650 | Goetz | Nov. 24, 1953 |
| 2,737,826 | Gebel | Mar. 13, 1956 |
| 2,834,842 | Le Beau | May 13, 1958 |
| 2,845,156 | Dayton | July 29, 1958 |